(12) United States Patent
Meier

(10) Patent No.: US 8,270,381 B2
(45) Date of Patent: Sep. 18, 2012

(54) METHOD FOR A SIMPLE 802.11E HCF IMPLEMENTATION

(75) Inventor: Robert Meier, Cuyahoga Falls, OH (US)

(73) Assignee: Cisco Technology, Inc., San Jose, CA (US)

( * ) Notice: Subject to any disclaimer, the term of this patent is extended or adjusted under 35 U.S.C. 154(b) by 67 days.

(21) Appl. No.: 12/824,766

(22) Filed: Jun. 28, 2010

(65) Prior Publication Data

US 2010/0265907 A1 Oct. 21, 2010

Related U.S. Application Data

(62) Division of application No. 10/394,780, filed on Mar. 21, 2003, now Pat. No. 7,801,092.

(51) Int. Cl.
*H04W 4/00* (2009.01)

(52) U.S. Cl. ............... 370/338; 370/230.1; 370/329; 370/310; 455/450

(58) Field of Classification Search .......... 370/230.1, 370/329, 338, 310; 455/450
See application file for complete search history.

(56) References Cited

U.S. PATENT DOCUMENTS

| 6,990,116 | B1 * | 1/2006 | Young et al. ............ 370/445 |
| 7,065,586 | B2 * | 6/2006 | Ruttenberg et al. ...... 709/244 |
| 7,177,275 | B2 * | 2/2007 | Stanwood et al. ........ 370/230 |
| 2002/0120740 | A1 * | 8/2002 | Ho et al. ................. 709/225 |
| 2004/0081095 | A1 * | 4/2004 | Liu et al. ............... 370/230.1 |

FOREIGN PATENT DOCUMENTS

JP 2003230177 A * 8/2003
* cited by examiner

*Primary Examiner* — Amancio Gonzalez
(74) *Attorney, Agent, or Firm* — Tucker Ellis LLP

(57) ABSTRACT

A Hybrid Coordination Function (HCF) implementation wherein an access point's existing (E)DCF transmit queues are augmented by at least one strict priority HCF transmit queue. The HCF queues are only used to schedule downlink data and CF-Poll transmissions are used for admitted downlink flows and for uplink flows. The 802.1D user priority value is used to select the HCF queue for an admitted flow. The strict priority HCF transmit queues are always serviced first, in priority order before any other (E)DCF transmit queue. The channel is considered busy to (E)DCF transmit queues while the strict priority queues are being serviced. An admissions control mechanism is used to control data flows and prevents the strict priority traffic from starving (E)DCF traffic. A single, simple AP scheduler is used for scheduling both polling times and station wakeup time.

21 Claims, 5 Drawing Sheets

Piggybacked 802.11e Poll:

Piggybacked 802.11e Poll, no data at the WSTA:

METHOD FOR A SIMPLE 802.11E HCF IMPLEMENTATION

CROSS REFERENCE TO RELATED APPLICATIONS

This application is divisional application of U.S. patent application Ser. No. 10/394,780, filed Mar. 21, 2003 now U.S. Pat. No. 7,801,092.

TECHNICAL FIELD

The present invention relates generally to Quality of Service (QoS) for a wireless network, and more particularly to a simplified Hybrid Coordination Function implementation for an 802.11 network.

BACKGROUND

Unless otherwise defined herein, the terms in this specification should be interpreted as defined, or as customarily used, in the Institute of Electrical and Electronics Engineers (IEEE) 802.11 and 802.11e specifications. The IEEE 802.11 and IEEE 802.11e specifications are hereby incorporated by reference. The current draft standard refers to the current draft supplement to the 802.11e specification, which is hereby incorporated by reference.

The current 802.11e draft standard for QoS defines two access methods—a Carrier Sense Multiple Access (CSMA)-based access method called EDCF and a hybrid access method call the Hybrid Coordination Function (HCF). In the HCF access method, a Hybrid Coordinator (HC) sends a poll to a client station (station) to grant the station a polled Transmission Opportunity (TXOP).

It is generally agreed that EDCF is not sufficient for QoS for interactive voice in an enterprise environment with "hidden" stations. However, HCF, as originally defined in the 802.11e draft, requires a very complex AP implementation. Therefore, most AP vendors (including Cisco) do not want to support it, at least not in an initial 802.11e-compliant release. Thus there exist a need for an AP HCF implementation that is greatly simplified and more "client friendly".

In addition to the aforementioned need, the error recovery mechanism, currently specified in the 802.11e draft, for HCF polled access is complicated and ambiguous. If the HC misses an expected response to a poll then both the HC and the station initiate error recovery. In some cases, the 802.11e error recovery mechanism can result in repeated collisions. Thus, the need exists for a simple method for handling polling error recovery.

In addition to the aforementioned needs, the current 802.11e draft describes two disparate QoS power-save methods. In an "Automatic Power-Save Delivery" method (APSD), stations establish "Wakeup Beacons" and the AP delivers buffered downlink frames immediately following the Wakeup Beacons.* An AP indicates that it has frames buffered for a station by setting the stations bit in the TIM in Beacons and Probe Response frames. In an HCF "Service Period" method, service periods for a station are separated by a minimum inter-service period. The AP can only transmit to a power-save station at the start of the station's service period, so that the station can "sleep" between service periods. The Service Period method has a known flaw where service period start times may become unsynchronized in the AP and station.

The APSD method is much simpler than the HCF "Service Period" power-save method described in the current 802.11e draft. APSD also has the advantage that, unlike the Service Period method, it works the same with EDCF or HCF. However, the APSD method in the current 802.11e draft has several drawbacks compared to the "Service Period" method: a) APSD requires a fast Beacon rate to support VoIP stations; b) APSD groups power-save traffic around Beacon transmissions; and c) APSD requires stations to stay awake to receive power-save traffic from other stations. Thus the needs exists for a single, consistent Simple Power-Save method for VoIP stations that does not require a fast Beacon rate, does not group power-save transmissions around beacon transmissions and does not require stations to stay awake to receive power-save traffic from other stations.

OVERVIEW OF EXAMPLE EMBODIMENTS

In view of the aforementioned needs, the invention contemplates methods for controlling channel access by an access point. Other aspects of the invention contemplate computer-readable medium of instructions for performing each method and an access point operable to perform each of the aforementioned methods.

The method for controlling channel access by an access point, comprises the steps of creating a strict priority queue, the strict priority queue is used to queue at least one of a poll and a data transmission; inserting at least one of a poll and a data transmission into the strict priority queue; starting a timer; and servicing the strict priority queue prior to servicing a (E)DCF transmit queues when the timer expires. Typically, the strict priority queue is a first in first out queue. A large fixed size may be assigned to all transmission opportunities. Furthermore, the creating step may create multiple strict priorities queues, wherein each queue is mapped to a specific traffic class. The traffic class is at least one selected from the group consisting of a voice management queue and a network management queue. At least one strict priority transmit queue is only used for frames subject to admission control, wherein the set of admitted frames subject to admission control is determined in the access point via QoS classification parameters.

In another aspect of the aforementioned method, the method contemplates binding an egress quality of service classifier by the access point to a target MAC address of an 802.11 station with an admitted traffic stream, and identifying downlink frames for the admitted traffic stream by the access point. The egress quality of service classifier comprises at least one of the group consisting of an internet protocol address, an internet protocol type, and a UDP/TCP protocol port identifier that uniquely identify an application traffic stream. The egress quality of service classifier parameters are obtained by a quality of service signaling protocol, or the parameters are automatically derived by the access point by snooping the data packets. A traffic class for a traffic stream may be determined by a quality of service signaling protocol. A transmitted frame is assigned to the strict-priority queue for the traffic class if fields in the frame match the corresponding values in the QoS classifier for the destination MAC address. Note that it is only necessary to apply such an egress QoS classifier to those transmitted frames where the destination MAC address matches the address to which the classifier is bound.

Another aspect of the aforementioned method contemplates that the method further comprises establishing a periodic polling schedule for a station, and placing a poll in a strict priority transmit queue at each scheduled polling period.

In still yet another aspect of the aforementioned method, the method establishes a wakeup schedule for a power-save station, wherein the wakeup schedule coincides with the power station's polling schedule and transfers active frames buffered for the station to an active transmit queue after a scheduled wakeup time, and indicates to the power-save station when data transfer is completed. The method may further comprise sending a poll frame to the power save station following a scheduled wakeup time, wherein the poll frame contains a field to inform the power-save station when there are buffered frames waiting to be transferred, or the access point may send a data frame to the power-save station with a field indicating when there are more queued frames. Polling times are scheduled to minimize at least one of latency and contention. Polling times can be scheduled distinct from beacon transmissions. Polling times are scheduled to minimize a time period the station must be awake.

Yet another aspect of the method is synchronizing the polling schedule with a standard 802.11 timer synchronization function (TSF). The polling schedule comprises a start time and an inter-poll period, wherein the start time is a TSF timer value and the inter-poll period is an integral multiple of TSF time units. The wakeup schedule for the power-save station is synchronized to a standard 802.11 timer synchronization function timer. Similarly, a service schedule may be defined by a start time and an inter-service period, wherein the start time is a TSF timer value and the inter-service period is an integral multiple of TSF time units.

Another aspect of the aforementioned method comprises establishing a service schedule based on a timer wheel, the timer wheel comprising clock ticks that are an integral of a TSF time unit, each clock tick comprising a bucket, the bucket comprising a linked list with an entry for each station to be serviced at the corresponding clock tick, where a station is serviced as follows: Any power-save data frames are transferred to the active transmit queues and a poll is queued at the tail end of a strict-priority transmit queue, if the station is scheduled for polling. Such a scheduler is significantly different than the reference scheduler described in the 802.11e draft, where polls are transmitted at scheduled times rather than simply queued for transmission in a FIFO queue.

Still yet another aspect of the aforementioned method comprises sending a downlink data transmission queued in the transmit queue, the downlink data transmission comprising a combined buffered frame and a "piggybacked" poll.

Yet another aspect of the aforementioned method contemplates that the strict priority queue is only used for data and poll frames for an admitted interactive voice stream and network management traffic.

Another aspect of the present invention is for a method for controlling access by an access point, the steps comprising allocating a fixed transmission window to a target station, the transmission window of sufficient size to enable the target station to send a maximum-length queued frame in response to a poll, establishing a polling schedule, allocating a maximum amount of uplink data based on an application data rate; and polling the station according to the polling schedule when the uplink data sent by the target station does not exceed an admitted data rate.

Another aspect of the invention is a method where a station can send a single uplink frame in response to a poll from the AP so that uplink and downlink transmissions can be interleaved to maximize bandwidth utilization; and so that error recovery for polled access is unambiguous if a poll or the corresponding uplink data frame is lost.

Another aspect of the invention is a method where an AP does not need to retransmit a poll if an expected response is not received; instead, the respective station can use EDCF access to send an uplink frame following a random backoff time after an expected poll is not received.

Typically, the method contemplates that the polling step further comprises transmitting a poll, the poll comprising a duration field, wherein the duration field is set to the fixed transmission window. The method may further comprise sending a frame to reduce the channel reservation when the station does not use the entire channel reservations, or the access point does not receive an expected response from the target station, or the channel may be reclaimed by the access point when the access point does not receive an expected response from the target station.

It is also contemplates that the allocating step further comprises allocating a token bucket for a data stream with a predetermined number of tokens, wherein the sum of the tokens represent a maximum allowed burst for the data stream. The polling step further comprises adding a token to the token bucket each time a service timer for the data stream expires, and removing tokens from the token bucket each time a data frame is successfully transferred. The polling step is suspended when the token bucket has no tokens. Furthermore, downlink frames are not queued in a strict priority queue when the token bucket has no tokens.

Another aspect of the present invention is for a method for controlling channel access by an 802.11 access point, the steps comprising creating a strict priority queue, the strict priority queue is used to queue at least one of a poll and a data transmission, assigning a fixed size to all transmission opportunities, inserting at least one of a poll and a data transmission into the strict priority queue, establishing a periodic polling schedule for a station, starting a service period timer and placing a poll in a strict priority transmit queue at each scheduled polling period, and servicing the strict priority queue prior to servicing (E)DCF transmit queues. Typically, the strict priority transmit queue is a first in first out queue, and the strict priority queue is only used for frames subject to admission control, wherein the set of admitted frames subject to admission control is established in the access point via a signaling protocol.

In another embodiment, the method further comprises establishing a wakeup schedule for a power-save station, wherein the wakeup schedule coincides with the power station's polling schedule, transferring active frames buffered for the station to an active transmit queue after a scheduled wakeup time, and indicating to the power-save station when data transfer is completed. Poll frames are sent to the power save station following a scheduled wakeup time, wherein each poll frame contains a field to inform the power-save station when there are buffered frames waiting to be transferred. A data frame may be sent to the power-save station with a field indicating when there are more queued frames. Preferably, wakeup/polling times are scheduled to minimize at least one of latency and contention. The polling times may be scheduled distinct from beacon transmissions, and preferably polling times are scheduled to minimize a time period the station must be awake. The polling schedule is synchronized with the existing standard 802.11 TSF. The polling schedule comprises a start time and an inter-poll period, wherein the start time is a TSF timer value and the inter-poll period is an integral multiple of the TSF time units. The start time and inter-poll period may or may not be set so that wakeup/polling times coincide with beacon transmissions; therefore the method can replace both the current 802.11e APSD and HCF Service Period methods.

Another aspect of the aforementioned method contemplates establishing a service schedule based on a timer wheel, the timer wheel comprising clock ticks that are an integral of a TSF time unit, each clock tick comprising a bucket, the bucket comprising a linked list with an entry for each station to be served at the corresponding clock tick.

Another aspect of the present invention contemplates a signaling protocol that comprises allocating a token bucket for a data stream with a predetermined number of tokens where the sum of the tokens represent a maximum allowed burst for the data stream. The admission control comprises adding a token to the token bucket each time the service timer expires, and removing tokens from the token bucket each time a data frame is successfully transferred. Servicing of the station is suspended when the token bucket has no tokens. Furthermore, downlink data frames are not queued in a strict priority queue when the token bucket for the respective downlink stream has no tokens and poll frames are not sent for an uplink stream when the respective token bucket has no tokens.

Still other objects of the present invention will become readily apparent to those skilled in this art from the following description wherein there is shown and described a preferred embodiment of this invention, simply by way of illustration of one of the best modes best suited for to carry out the invention. As it will be realized, the invention is capable of other different embodiments and its several details are capable of modifications in various obvious aspects all without from the invention. Accordingly, the drawing and descriptions will be regarded as illustrative in nature and not as restrictive.

BRIEF DESCRIPTION OF THE SEVERAL VIEWS OF THE DRAWING

The accompanying drawings incorporated in and forming a part of the specification, illustrate several aspects of the present invention, and together with the description serve to explain the principles of the invention. In the drawings.

DETAILED DESCRIPTION OF INVENTION

Figure 1:
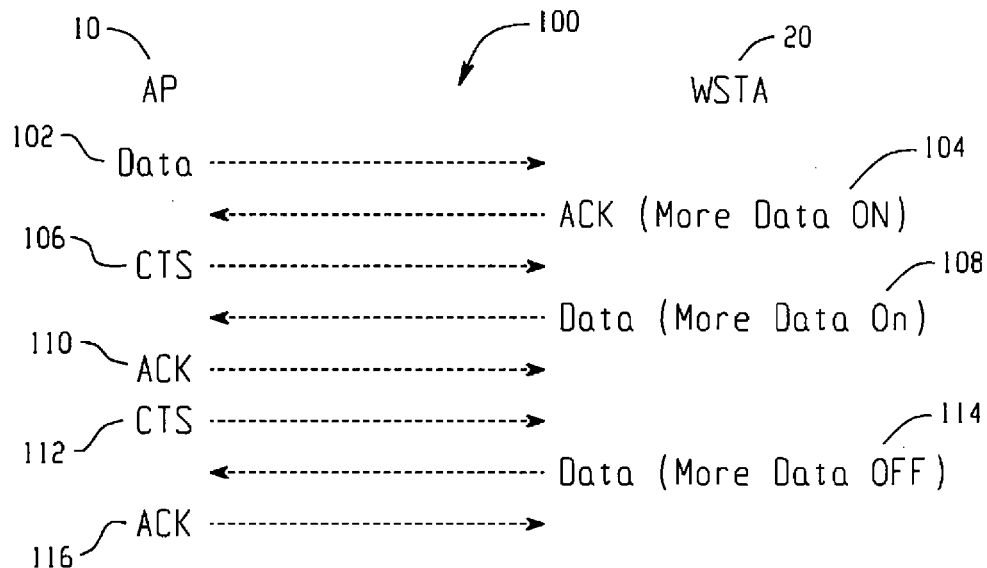
FIG. 1 is an example of an exchange between an access point and a non-802.11e wireless station for an unsolicited clear to send signal.

Throughout this description, the preferred embodiment and examples shown should be considered as exemplars, rather than limitations, of the present invention.

The current 802.11e draft standard for QoS defines two access methods—a CSMA-based access method called EDCF and a hybrid access method call the Hybrid Coordination Function. In the HCF access method, a Hybrid Coordinator (HC) sends a poll to a client station to grant the station a polled Transmission Opportunity (TXOP).

It is generally agreed that EDCF is not sufficient for QoS for interactive voice in an enterprise environment with "hidden" stations. However, HCF, as originally defined in the 802.11e draft, requires a very complex AP implementation. Therefore, most AP vendors (including Cisco) do not want to support it, at least not in an initial 802.11e-compliant release. This document proposes an AP HCF implementation that is greatly simplified and more "client friendly".

The simple AP HCF implementation of the present invention, described below, is an alternative to a more complex HCF implementation where:

1) A complex HCF scheduler in the AP generates poll transmissions (i.e. CF-Poll frames) in fixed time-slots.
2) Each CF-Poll allocates a small TXOP size, which is sized to just accommodate an "uplink" transmission from a client station.
3) A station communicates "queue size" information to the HC, so that the HC can constantly adjust the TXOP size to accommodate the station's uplink transmissions.
4) The AP must support two disparate power-save mechanisms.

The components of the simple AP implementation are summarized below. A detailed description of the AP implementation follows. The components of the simple AP implementation comprise:

1) A very simple AP HCF transmission scheduler. Polls are not sent in fixed time slots; instead, polls are queued in an HCF FIFO strict-priority transmit queue.
2) The HC always grants large polled TXOPs with a fixed size. The HC never needs to recalculate TXOP sizes or timer periods.
3) Simple "Token Bucket" policing is used as an alternative to "small TXOPs". Policing is at the application data rate—so that the application is isolated from 802.11 rate-shifting and retransmissions.
4) The station is generally responsible for error recovery if the HC does not received an expected response to a poll; therefore, a poll is really more like an "Unsolicited CTS". Error recovery in a polled TXOP requires further definition in the 802.11e draft; however, another aspect of the present invention is directed to a simple polling error recovery method.
5) A mechanism is provided to recover the unused portion of a large TXOP.
6) The HCF scheduler supports a single, unified power-save mechanism where scheduled wakeup times can coincide with scheduled polling times and scheduled wakeup times may or may not coincide with Beacon transmissions.
7) HCF channel access is consistent with EDCF channel access. "HCF" can be considered as the highest EDCF priority.

A detailed explanation of the AP HCF Implementation contemplated by the present invention will now be given.

The existing (E)DCF transmit queues of the AP are augmented by one or more strict-priority HCF transmit queues. The HCF queues are only used to schedule downlink data and CF-Poll transmissions for "admitted" downlink and uplink flows. The 802.1D User Priority value is used to select the HCF queue for an admitted flow. Admitted downlink and uplink flows are typically negotiated between the AP and a station when a new traffic flow is initiated and when the station associates with a new AP. The TCLAS and TSPEC fields, specified in the current 802.11e draft, can be used to identify the flows.

By default, HCF access is only used for admitted interactive voice flows (i.e. the HC only accepts TSPECs for User Priority 6) and EDCF is used for other QoS traffic. However, the user can enable HCF access for other User Priorities.

QoS Policy is not within 802.11e's scope, except that it should be possible for an AP vendor to determine the set of allowed HCF user priorities for a client station. It should be noted that the 802.11e distributed first-come-first-serve "admissions control" mechanism does not support policy-based QoS differentiation.

The strict-priority HCF transmit queues are always serviced first, in priority order, before other (E)DCF transmit queues. The channel is considered "busy" with respect to EDCF, while a strict-priority queue is serviced. "Admissions control," one method of which is described herein infra, prevents the strict-priority traffic from starving prioritized (E)DCF traffic.

The present invention contemplates that a service timer is started in the AP for each admitted flow (or aggregated flows if a station has more than one flow). The period of the timer is established by the AP based on parameters signaled by the station. A CF-Poll transmission is queued in the strict-priority queue when the service timer expires. As an optimization, an AP can use a single timer for multiple stations with similar service periods.

A (+)CF-Poll allocates a "polled TXOP" in the contention period. The station is generally responsible for error recovery if a poll or the response to a poll is lost. In the simple implementation of the preferred embodiment, an HCF poll is really handled more like an "Unsolicited CTS". Therefore, HCF polling is much simpler than legacy PCF polling.

As an option, the HC can retry polls if a station doesn't respond to a poll within a PIFS time—but back-to-back polls should not be repeatedly sent to the same station. Spatial reuse can be increased if polls are retried in some round-robin order. In a simple implementation, an unsuccessful CF-Poll can be re-queued, in an HCF retry queue, if an expected uplink frame is not received.

As an option, a station can use EDCF channel access to send an uplink frame following some backoff period after an expected poll is not received; therefore, the HC does not need to retry polls.

Error recovery, if a poll or the response to the poll is lost, can be greatly simplified and more robust if a station can send exactly one frame in response to a poll. [In the current draft, both the AP and station may initiate error recovery if the response to a poll is lost, resulting in repeated collisions.]

Contention-free Periods (CFPs) are not used for CF-Poll transmissions. However, a CFP can (optionally) be used to transmit power-save multicast frames following a DTIM Beacon transmission.

One aspect of the present invention is that a CF-Poll always allocates a constant, large TXOP (e.g. the maximum TXOP size for the access class). Then, the HC never needs to recalculate TXOP sizes (or service timer periods). A station can always respond with the frame at the head of the queue and the station can, optionally, retransmit in the TXOP if an uplink frame is not acknowledged. The AP does not need to process "queue size" information in uplink frames.

Any unused portion of a (i.e. large) polled TXOP is reclaimed as follows: a) The station explicitly returns the channel to the HC by indicating the last frame in the TXOP, or b) the HC can reclaim the channel if CCA is still asserted after a PIFS time after a poll transmission (i.e. if the station does not respond). The HC can use the reclaimed portion of the TXOP or it can send a frame that reduces the channel reservation in other stations (i.e. that resets the NAV).

Frames for admitted downlink parameterized flows are also queued in an HCF strict-priority queue (ignoring power-save logic). The AP uses an 802.11 egress QoS classifier that is bound to the target MAC address to classify such downlink frames. The classifier parameters are obtained from the TCLAS element sent by the station for the downlink flow or are automatically derived by "snooping" packets. The classifier assigns the (i.e. strict-priority HCF) queue, priority, and (optional) max. delay for the respective frame. The AP must lookup the target MAC address for all QoS and non-QoS downlink transmissions. Therefore, the only QoS classification overhead for other unadmitted downlink traffic is checking a NULL classifier pointer.

As an optimization, an HC can combine a queued downlink transmission and queued CF-Poll, for the same station, so that a poll is piggybacked on a downlink transmission. Note that there isn't any additional overhead for piggybacking a poll on each downlink transmission, since a station that does not have data to send can simply respond with a QoS Ack with the "queue size" set to '0'.

Uplink and downlink flows are "policed" at the application data rate, so that the application is not penalized for retransmissions and rate-shifting. Policing is used as an alternative to allocating small TXOPs that just support the admitted data rate. Allocating small polled TXOPs effectively polices the station at the PHY rate. Policing at the application data rate is much more user-friendly. The HC uses a "Token Bucket" to police admitted uplink and downlink flows. The Token Bucket is initialized with a preset number of tokens and tokens are added to the bucket at the mean data rate (plus some fudge factor) each time the service timer expires. If the station runs out of tokens, downlink transmissions or polling is suspended.

The station can choose to operate in active or power-save mode. If the station operates in power-save mode, then CF-Poll and downlink data transmissions for an admitted HCF flow are queued in the station's power-save queue until the station is awake. In power-save mode, the station must use a signaling protocol to establish scheduled "Wakeup Times", where scheduled Wakeup Times may or may not coincide with Beacon transmissions. Frames are automatically transferred from the power-save queue to the active transmit queues at each scheduled Wakeup Time.

APSD is simpler than the HCF-based "Service Period" power-save method defined in the current 802.11e draft; however, the current APSD method has several drawbacks compared to the Service Period method. Another aspect of the present invention contemplates a "Simple Power-Save method for VoIP stations" (described herein infra) that describes an "enhanced APSD" method that addresses the drawbacks.

Admissions control is based on some configurable percentage of the expected total effective bandwidth. If channel conditions deteriorate, the percentage of bandwidth used for HCF traffic (e.g. voice) will increase and the percentage of bandwidth used for (E)DCF traffic will decrease. However, the AP will continue to sustain admitted flows if the configured percentage of bandwidth is not too high.

Another aspect of the present invention is a simple station HCF implementation. This aspect avoids the problems that occur when the HC allocates small polled TXOPs. When the HC allocates small polled TXOPs, then the station must first determine if a frame fits in a polled TXOP before responding.

If the frame doesn't fit, the station must send a QoS Null frame, with queue size information—all within a SIFS time. The AP processes the queue size information and, presumably, retransmits a poll with a larger TXOP. However, with the simple station HCF implementation, a station can implement a single highest-priority HCF queue that is used for polled uplink transmissions. A station can specify a "minimum TXOP size" in an add TSPEC request; therefore a station can be implemented so that it always responds to a poll by transmitting a data frame at the head of the HCF queue (or another, possibly null, frame if the queue is empty).

Another aspect of the present invention is for a Simple HCF VoIP implementation. This aspect is for a HCF or HCF-like VoIP implementation that does not require polling timers in an AP. In general, AP downlink transmissions effectively drive uplink station transmissions. A station can indicate that it has uplink data queued for transmission by setting a field in a transmitted ACK frame and an AP can optionally piggyback a poll on a downlink frame.

There are several methods that can be used with this aspect of the present invention. Typically, at least two methods are used, one method for non-802.11e stations and one method for 802.11e stations. It should be noted that a station that supports 802.11e can function as a non-802.11e station. The method for the 802.11 station may use an 802.11e poll or a piggybacked 802.11e poll as will be described herein infra.

This aspect contemplates that VoIP stations use explicit TSPEC signaling for admissions control. An AP uses strict-priority queuing and high-priority HCF channel access for downlink voice flows, as described supra. HCF channel access is implemented as the "highest-priority EDCF access category"; therefore, support for downlink HCF adds little complexity. A combined access method, which uses both EDCF and simple polling without error recovery, is negotiated as the access method for uplink voice flows via TSPEC signaling.

A non-802.11e station can indicate to its parent AP that it has a frame queued for an admitted uplink voice flow by setting the "More Data" bit ON in a transmitted ACK frame or data frame. When the AP receives an ACK frame, with the More Data bit set ON, it should generate an "unsolicited CTS", with the "duration" field set so that it reserves the channel for the respective uplink voice transmission.

An 802.11e station can indicate to its parent AP that it has a frame queued for an admitted uplink voice flow by setting a non-zero "queue size" (or More Data bit) in a transmitted QoS CF-ACK frame. When the AP receives a QoS CF-ACK or data frame with a non-zero queue size field, it should generate a Poll frame, with a duration that reserves the channel for the respective uplink voice transmission.

The AP can reclaim the channel if CCA is still asserted for a PIFS time after it transmits an unsolicited CTS frame or Poll frame. The AP does not need to retry the CTS or Poll frame.

The AP can, optionally, piggyback a Poll on a downlink QoS Data frame sent to an 802.11e station to solicit an uplink frame(s). The 802.11e station must respond to the Poll with a) a QoS Data+Ack frame or b) a QoS Ack frame with a queue size value of 0. Note that the second option enables the AP to piggyback polls on all downlink frame without adding the overhead of a QoS Null Data transmission during periods of silence suppression. An AP can, optionally, "learn" that it should automatically piggyback polls on downlink transmissions by monitoring uplink transmissions or piggyback polling can be explicitly negotiated via TSPEC signaling.

In the absence of silence suppression by the peer voice station, the simple HCF-like VoIP implementation enables downlink voice transmissions to solicit uplink voice transmissions, much like timer-based HCF polling; therefore, it has many of the advantages of HCF. However, it is simpler than HCF because the AP does not need to maintain poll timers or keep any polling state information. An "unsolicited CTS method", described below, does NOT require 802.11e frame formats; therefore, it can be used to support non-802.11e stations.

The frame exchange sequences illustrated in FIGS. 1-4 exemplify simple HCF for VoIP. Note that a "QoS Data", "QoS ACK", or "QoS Poll" frame contains an 802.11e QoS Control field. An ACK and Poll can be combined in a single 802.11e ACK+Poll frame. Each of the figures illustrate a bi-directional burst of frames that are sent with the minimum "short interframe spacing" (SIFS) following a single execution of the HCF channel access algorithm by the AP.

Referring first to FIG. 1, there is shown the exchange 100 that occurs between an AP 10 and a station 20, which would typically occur for non-802.11e stations. In step 102 the AP 10 executes the channel access algorithm and transmits data to the station 20. The station 20 then sends an ACK 104 with the more data bit set on to indicate that it has data queue for transmission. This causes the AP 106 to transmit a CTS as shown in step 106 to yield the channel to the station. Then as shown in step 108 the station 20 sends data, and as shown in this example the more data bit is set on. The AP 10 then sends an ACK at step 110 upon receiving the data. Because the more data bit is set on, the AP 10 then transmits another CTS as shown at step 112. The station 20 then responds with more data as shown in step 114. In this example, when the data is sent at step 114, the more data bit is set off. This causes the AP 10 to then send an ACK as shown in step 116, but the AP 10 does not transmit another CTS after the ACK. If the more data bit is set on at step 114, then the AP 10 would send another CTS.

Figure 2:
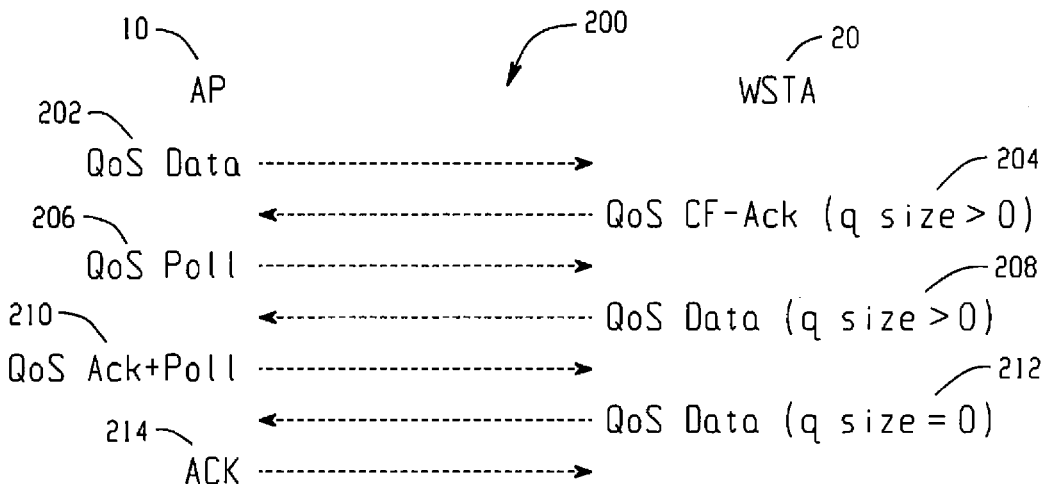
FIG. 2 is an example of an exchange between an access point and an 802.11e station when the access point sends an 802.11e poll.

Referring now to FIG. 2, there is shown an exchange 200 when the AP 10 sends an 802.11e poll. At step 202 the AP 10 then sends QoS data to the station 20. The station 20 responds at step 204 with a QoS CF-Ack, with the queue size being greater than zero. Because the queue size is greater than zero, or non-zero, this causes the AP 10 at step 206 to send another QoS Poll. At step 208 the station 20 respond with QoS data, and again as shown in this example the q size is greater than zero. This causes the AP 10 to respond ate step 210 with a QoS Ack and a Poll (QoS Ack+Poll). Upon receiving the QoS Ack+Poll, the station 20 sends more QoS data as shown in step 212. As shown in this example, the queue size equals zero. However, if a non-zero queue size is set, then the process would loop back to step 210.

Figure 3:
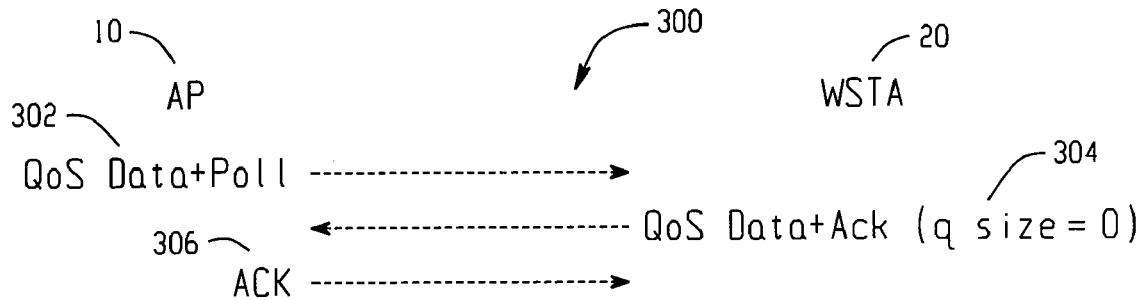
FIG. 3 is an example of an exchange between an access point and an 802.11e wireless station when the access point sends a piggybacked 802.11e poll.

Referring now to FIG. 3, there is shown an exchange 300 that occurs between an AP 10 and a station 20 using a Piggybacked 802.11e Poll. At step 302 the AP 10 sends QoS data and a poll (QoS data+Poll) to the station 20. The station 20 responds with QoS Data and an Ack (QoS Data+Ack) at step 304. In this example the q size is set to zero at step 304 so at step 306 the AP 10 only responds with an ACK, otherwise, provided the station 20 has not exceeded its admission control, the AP 10 would transmit another poll at step 306 and the process would continue until the station 20 sends a QoS Data+Ack with the queue size equal to zero, or the station 20 has exceeded its admission control.

Figure 4:
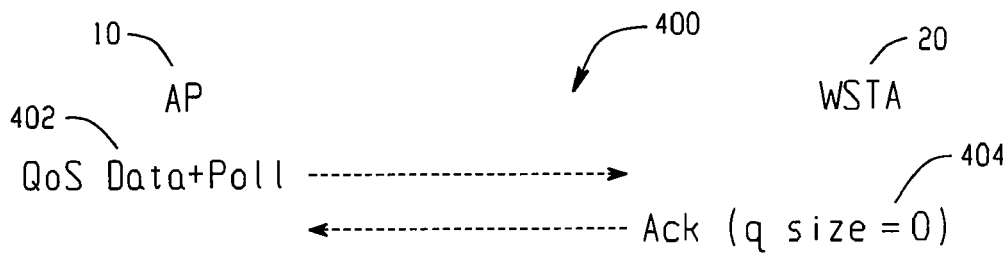
FIG. 4 is an example of an exchange between an access point and an 802.11e wireless station when the access point sends a piggy backed 802.11e poll and the wireless station has no data for the access point.

Referring now to FIG. 4, there is shown an exchange 400 that occurs when the AP 10 sends a Piggybacked 802.11e Poll and there is no data waiting at the station 20. At step 402 the AP 10 sends QoS Data and a Poll (QoS Data+Poll) causing the station 20 to respond at step 404 with an Ack, and the queue size set to zero.

Note that there is almost no added overhead for piggybacking a poll on each downlink frame sent to a station 20, even if the station 20 does not have data to send (i.e. even if silence suppression is used). If the station 20 does not have data to send, then it can respond to a Data+Poll with a QoS ACK (i.e. with the "queue size" set to 0) and the exchange is over, as shown above.

Another aspect of the present invention is a simple polling error recovery method. The error recovery mechanism, currently specified in the 802.11e draft, for HCF polled access is complicated and ambiguous. If the HC misses an expected response to a poll then both the HC and the station initiate error recovery. In some cases, the 802.11e error recovery mechanism can result in repeated collisions. In an embodiment of the present invention there is contemplated a polling error recovery mechanism for stations that primarily use EDCF to send uplink frames but still respond to HC polls. The proposed error recovery mechanism is defined by the following rules:

1) A station uses EDCF to send uplink frames.
2) Both the AP and station use the normal HCF and EDCF backoff rules whenever an expected response is not received.
3) A station that is using EDCF for an uplink stream can send exactly 1 frame in response to a poll from the HC (i.e. either a Data+Ack frame or an Ack frame).
4) If the AP receives a Data+Ack frame (i.e. a data frame with a piggybacked Ack) from a station, with a non-zero queue size, it can, optionally, poll the station (i.e. again). Therefore, a station can send multiple frames in a single polling sequence.
5) Normal EDCF access is the recovery method used to retransmit a frame if a poll is lost or if an Ack is lost following a polled uplink transmission. Therefore, an AP does not need to retransmit a poll if a response is not received. Note that the AP must retransmit a Data+Poll frame if an Ack is not received.

Still another aspect of the present invention contemplates a very simple AP polling/wakeup scheduler, based on a "timer wheel", that can be used to support periodic polling and/or wakeup schedules established for stations. The same scheduler can be used to support a) APSD, b) scheduled wakeup times that are not aligned with beacons, and c) polling schedules.

Another aspect of the present invention is a Simple Power-Save method for VoIP stations. The current 802.11e draft describes an Automatic Power-Save Delivery Method (APSD) where stations establish "Wakeup Beacons" and the AP delivers buffered downlink frames immediately following the Wakeup Beacons. An AP indicates that it has frames buffered for a station by setting the stations bit in the TIM in Beacons and Probe Response frames.

The APSD method is much simpler than the HCF "Service Period" power-save method described in the current 802.11e draft. APSD also has the advantage that, unlike the Service Period method, it works the same with EDCF or HCF. However, the APSD method in the current 802.11e draft has several drawbacks compared to the "Service Period" method: a) APSD requires a fast Beacon rate to support VoIP stations; b) APSD groups power-save traffic around Beacon transmissions; and c) APSD requires stations to stay awake to receive power-save traffic from other stations.

The APSD drawbacks can be largely addressed if APSD is enhanced as follows:

1) The HC and a station can negotiate a Wakeup Time schedule where scheduled Wakeup Times may or may not coincide with Beacon transmissions.
2) HC polling is integrated with the Wakeup Time schedule, so that a poll is sent to a power-save station at each scheduled Wakeup Time.
3) An AP can set the "More Data" bit ON in an ACK frame sent to a station operating in APSD mode to indicate that it has frames buffered for the station.
4) If an APSD station receives an ACK with the More Data bit set ON, it must operate exactly as if it received a TIM (i.e. in a Beacon) with its bit set ON: It must stay awake until it receives a Data frame with the More Data bit set OFF or a TIM with its bit set OFF.

In the absence of silence suppression, a power-save VoIP station must wake up each voice sample period to send an uplink transmission. Therefore, the enhanced APSD method enables the AP to deliver buffered frames to an APSD station at the VoIP sampling rate, without the drawbacks in the current 802.11e APSD method.

Figure 5:
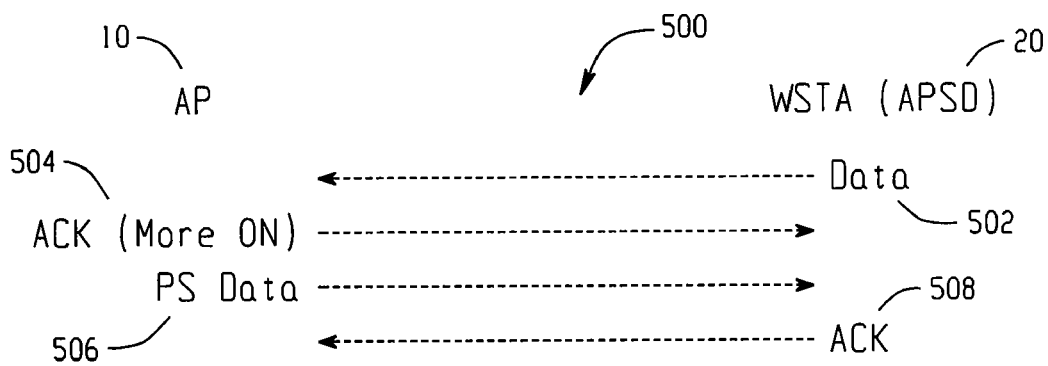
FIG. 5 is an example frame exchange sequence for a power save wireless station.

An example frame exchange sequence 500 is shown in FIG. 5. The sequence starts at step 502 wherein station 20 sends data to AP 10. At step 504 the AP 10 sends an ACK with the More Data bit set on, followed by the Power Save data as shown in step 506. At step 508 the station 20 responds with an ACK.

Figure 6:
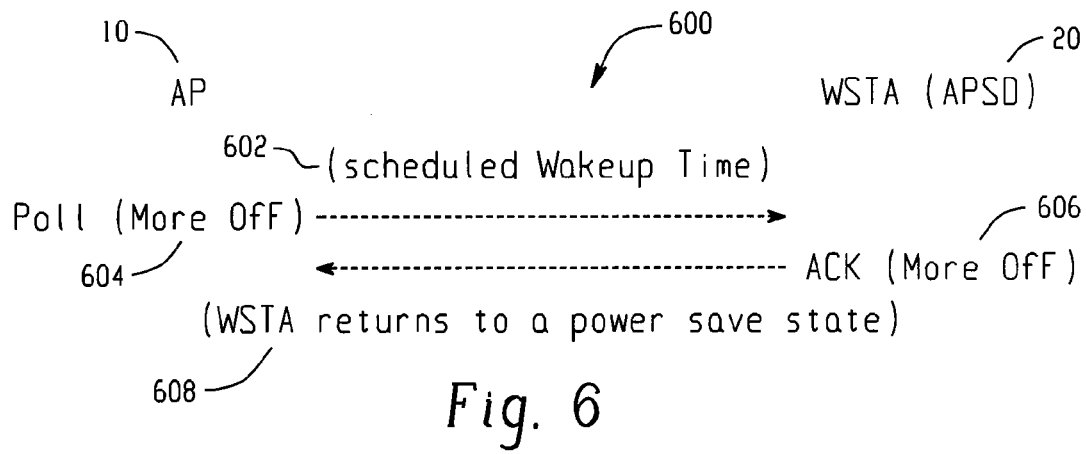
FIG. 6 shows an example frame exchange sequence wherein an AP generates a poll at each scheduled wakeup period for a power save wireless station.

The method described for FIG. 5 above is not sufficient for power management with VoIP stations that use silence suppression. In that case, the HC and station can use the enhanced APSD power-save method, where the HC generates a poll at each scheduled wakeup period. The poll enables the station to quickly return to the doze state, in the absence of other uplink or downlink traffic, as shown by the frame exchange sequence 600 in FIG. 6. The AP 10 waits until a scheduled wakeup time as shown at step 602. At step 604 the AP 10 sends a poll with the More Data bit set to off. At step 606 the station 20 sends an ACK with the More Data bit set off, then as shown at step 608 the station 20 returns to a power save state.

Figure 7:
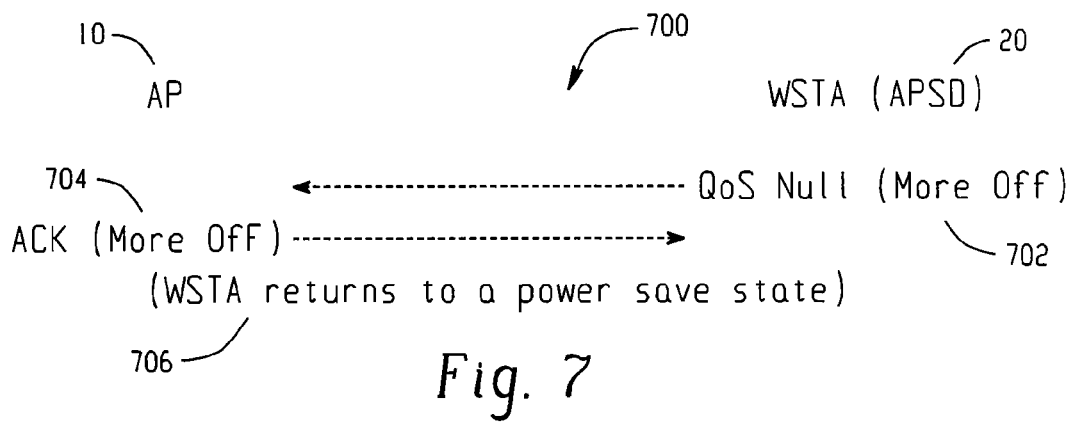
FIG. 7 shows an example frame exchange sequence wherein a wireless station generates a NULL frame to poll an AP for buffered power save frames.

Similarly, a VoIP EDCF station can generate QoS Null frames during periods of silence suppression, to "poll" the AP for buffered power-save frames, as shown in FIG. 7. The frame exchange sequence 700 starts at step 702 when the station 20 sends a QoS Null with the More Data bit set off. In response the AP 10 sends an ACK with the More Data bit off, unless of course there is buffered data, as shown in step 704. At step 706 the station returns to a power save state.

Figure 8:
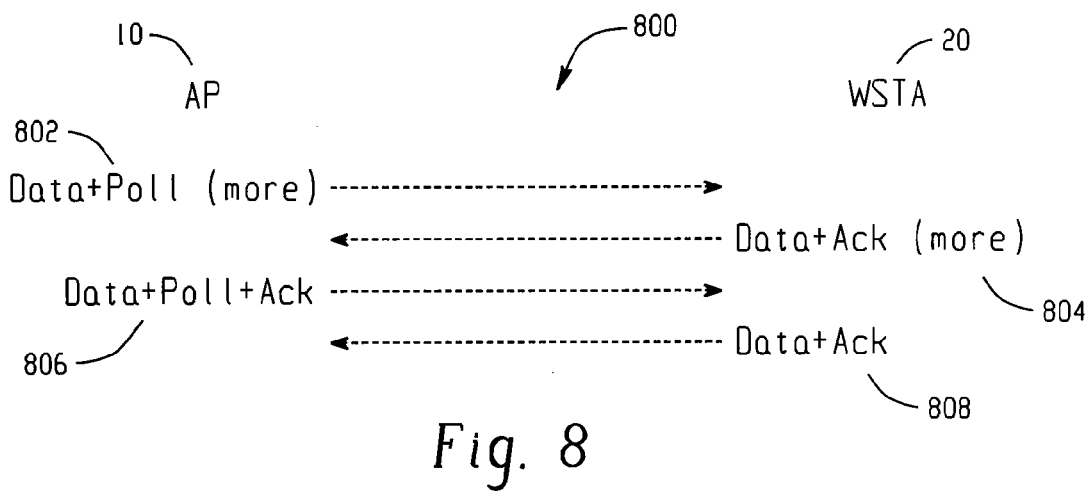
FIG. 8 is an example frame exchange sequence that demonstrates how downlink and uplink data transmissions can be interleaved.

Referring now to FIG. 8 there is shown an example frame exchange sequence 800 that shows how downlink and uplink data transmissions can be interleaved. As shown at step 802, the AP 10 sends a Data+Poll with the More Data bit set, indicating the AP 10 has additional data to send, to the station 20.

At step 804 the station 20 responds with Data+Ack with the More Data bit on, indicating that station 20 has more data to send also, to the AP 10. The Ack is to acknowledge the data sent at step 802.

At step 806 the AP responds with Data+Poll+Ack. The station 20 is expecting the data because the More Data bit was set at step 802. The poll is sent in response to the More Data bit being set on by the station 20 in step 804, and of course the ACK is sent in response to the data sent at step 804. At step 808 the station 20 sends data+Ack. Because the AP 10 did not have the More Data bit set on when sending its last transmission at step 806 and the station 20 did not have the More Data bit set on when sending its last transmission at step 808, this concludes the frame exchange sequence 800.

Figure 9:
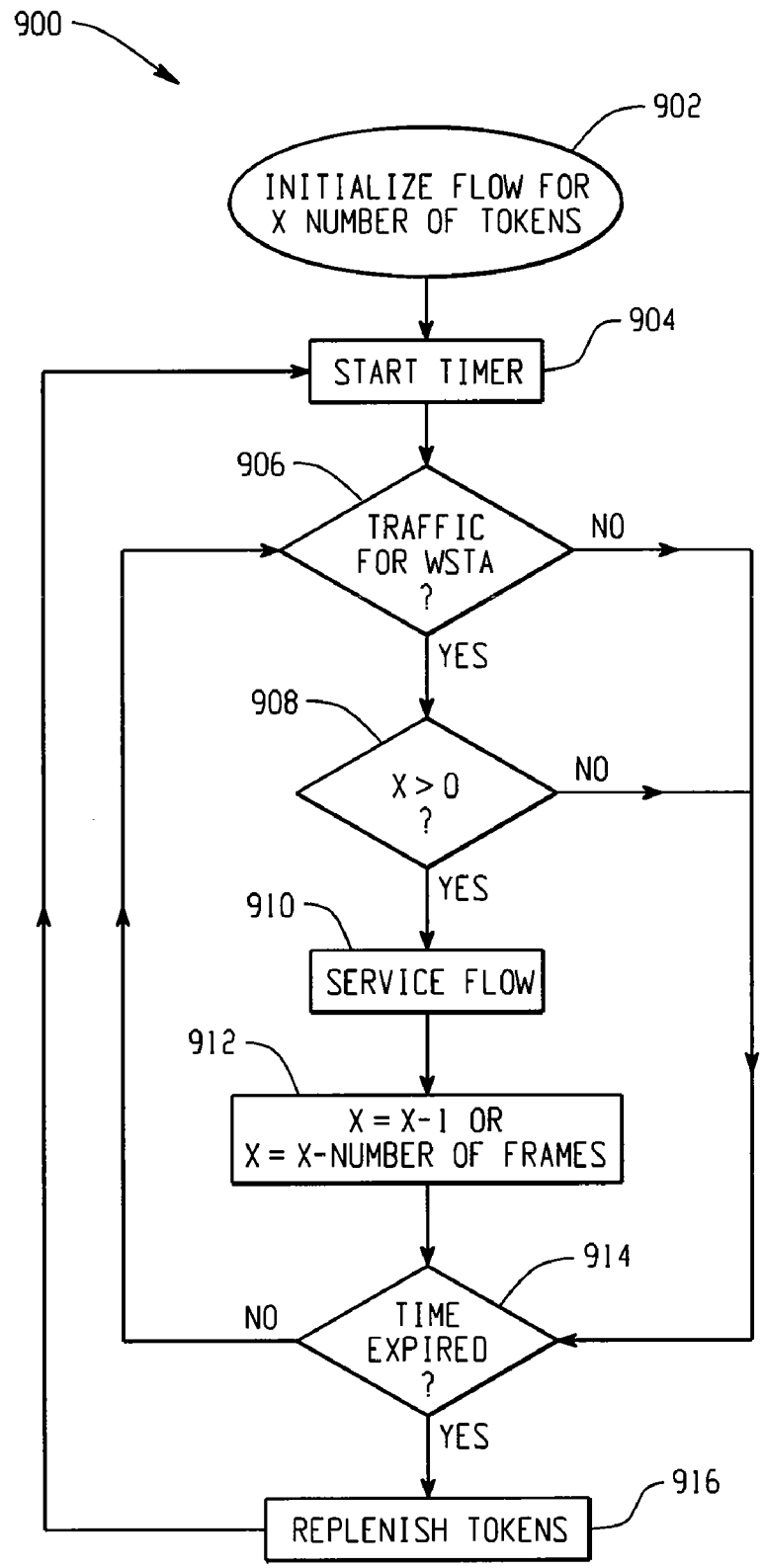
FIG. 9 is a block diagram of an example process flow for an admission control method.

Referring now to FIG. 9, there is shown an admission control process flow 900. The process starts at step 902 wherein the Token Bucket is initialized with a number of tokens "X." A timer is then started at step 904. At step 906 the AP (not shown) checks if there is traffic for the station (not shown). If there is traffic for the station, then the process continues to step 908 where it is determined if there are any tokens left (X>0). If there are tokens left then the flow, which can be an uplink or downlink flow is serviced as shown by step 910. At step 912 the number of tokens X is decremented upon a successful uplink or downlink. The number of tokens may be decremented by one, the number of frames processed in the uplink or downlink, or by any other method in order to insure the station does not use more traffic than the AP admitted the station to use. For processes that allow multiple frames to be sent at once, step 908 may be modified to determine if X−# of frames is greater than or equal to zero. After adjusting the number of tokens at step 912, the process continues to step 914 where the timer is checked to determine if it expired. Each time the timer expires, as shown by step 916, some number of tokens, Y, where X<=Y, is added to the Token Bucket; however, the total number of tokens in the Token Bucket is capped at some max. value. If the timer expired then the tokens are replenished as shown by step 916 and processing returns to step 904 and the timer is re-started. If the timer has not expired, then the process returns to step 906 to check if there is more traffic for the station.

If at step 906 there is no traffic for the station then the process goes to step 912 to determine if the timer has expired.

If at step 908 it is determined that the station has no more tokens, then no further traffic for the station is handled until the timer expires at step 912.

Another aspect of the present invention is a Simple Polling/Wakeup Scheduler. This aspect is a very simple AP polling/wakeup scheduler, based on a "timer wheel", that can be used to support periodic polling and/or wakeup schedules established for stations. The same scheduler can be used to support a) APSD, b) scheduled wakeup times that are not aligned with beacons, and c) polling schedules.

A "timer wheel" is a circular list of "buckets" (or a circular queue), where each bucket corresponds to a "clock tick" and each bucket contains a, possibly empty, linked list of "timer structures". A "current pointer" is advanced to the next bucket at each clock tick. A bucket is serviced when it is the "current bucket". A timer is started by inserting it into the bucket in the timer wheel where the distance from the current pointer equals the timer period in units of clock ticks.

For the AP polling/wakeup scheduler, a timer wheel "clock tick" is some integral multiple of TSF timer ticks, and a "timer structure" points to a station with a polling and/or wakeup schedule. The AP can establish the wakeup, polling, or combined wakeup/polling schedule for a station. Therefore, it can establish a service schedule start time, for a station, that is aligned with a timer wheel bucket and a service period that is a multiple of timer wheel clock ticks.

At each clock tick, the scheduler services all of the stations in the respective bucket. The AP services a station with a scheduled Wakeup Time by moving the station's power-save frames to the active 802.11 transmit queues. The AP places a, possibly piggybacked, poll in the strict-priority transmit queue for a station that is scheduled for polling (i.e. a station with an admitted uplink voice flow).

The time to start/stop a timer wheel timer is Order(1) regardless of the number of stations (if buckets are implemented as a doubly linked list). An algorithm is Order(1) if the runtime is constant, regardless of the number of nodes. An algorithm is Order(N) if the runtime increases proportionally with the number of nodes. In many timer Order(N) timer algorithms, a timer is added to a sorted list of timers. The runtime to start a timer is proportional to the number of timers, because the list must be searched to find the correct position.

Figure 10:
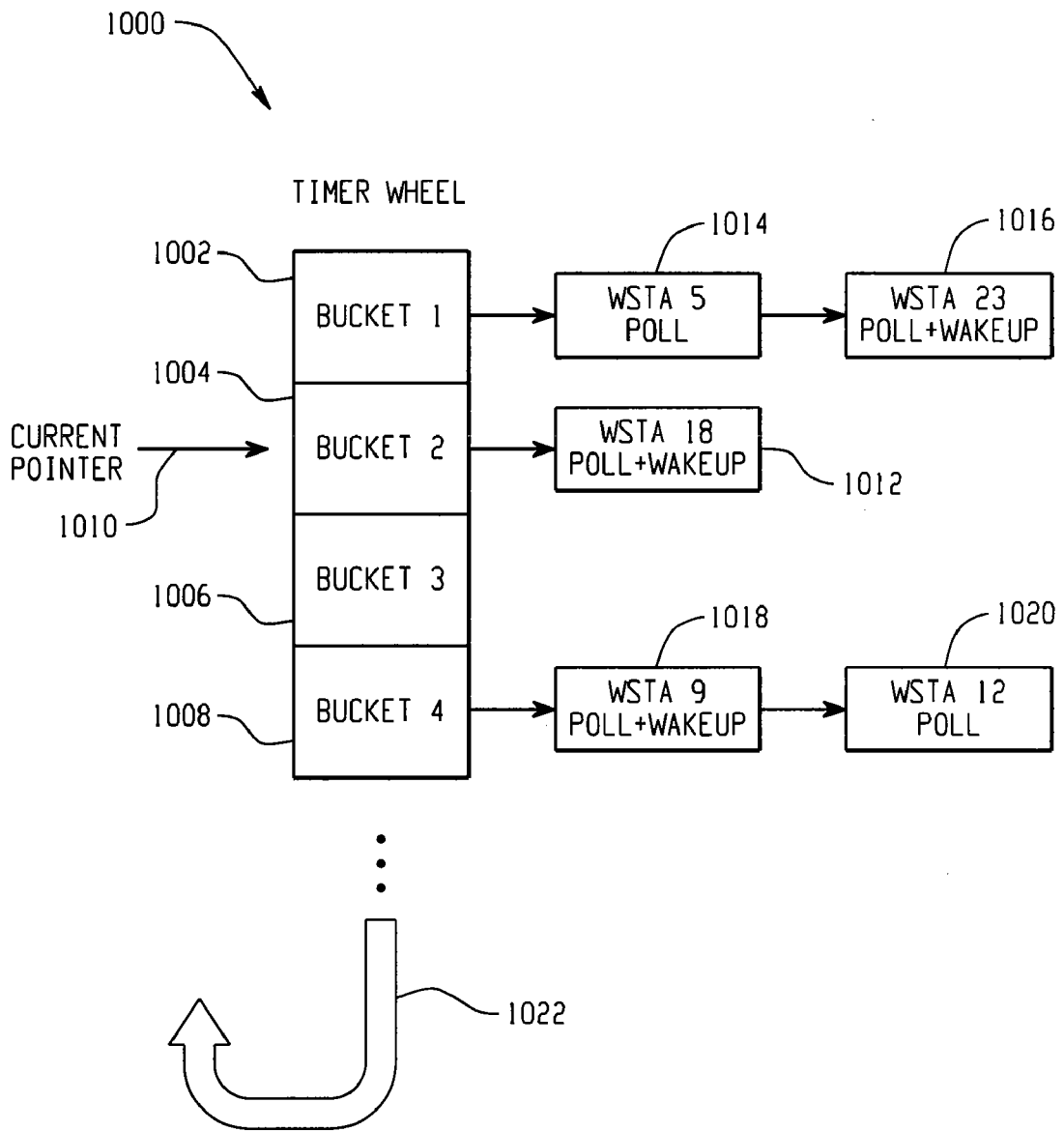
FIG. 10 is a block diagram of a timer wheel.

FIG. 10 is an example of the operation of the timer wheel 1000. The timer wheel 1000 comprises four buckets, bucket 1 1002, bucket 2 1004, bucket 3 1006 and bucket 4 1008. A current pointer 1010 determines which bucket is being serviced. After the current pointer 1010 reaches the last bucket, as shown by 1022 the current pointer is reset and starts again at Bucket 1 1002.

Bucket 1 1002, Bucket 2 1004 and Bucket 4 1008 has tasks or flows assigned to it. Bucket 3 1006 currently has no tasks, however tasks or flows may be assigned as needed. Similarly, tasks currently serviced by the other buckets may be deleted as the station moves to another AP. Bucket 1 1002 has two tasks assigned, first at 1014 is to poll station 5 (not shown) and then as shown by 1016 is a poll+a wakeup to station 23 (not shown). Bucket 2 1004 has one task as shown by 1012 and that is a poll and a wakeup to station 18 (not shown). Bucket 4 1008 has two tasks assigned, first as shown by 1018, a poll and a wakeup for station 9 (not shown), then as shown by 1020, a poll for station 12 (not shown).

As shown in FIG. 10, the current pointer 1010 is at Bucket 2 1004, thus a poll and a wakeup will be sent to station 18. At the next clock tick the current pointer 1010 will move to Bucket 3 1006 and since there are no tasks or flows, no polls or wakeups will be sent. After another clock tick, the current pointer 1010 will move to Bucket 4 1008, which will then cause a poll and a wakeup to be sent to station 9 and a poll to station 12. After reaching the end of the list, the current pointer will restart at Bucket 1 2002, whereupon a poll will be sent to station 5 and a poll and a wakeup sent to station 23.

As those skilled in the art can readily appreciate, the methods described herein are substantially different than the methods currently described in the 802.11e draft for the reasons listed below.

1) The 802.11e draft has a "reference scheduler" where polls are transmitted at scheduled time periods. In the simple HCF scheduler, described herein, (possibly piggybacked) polls are simply added to the tail of a FIFO strict-priority queue (i.e. when a poll timer expires). The "transmit scheduler" simply operates in a loop servicing the strict-priority queue whenever it is not empty. Multiple service periods can be grouped into a single bucket, since polls are simply queued for transmission as any other downlink frame. It is more straight-forward to coalesce data and polls into a single frame (e.g. a poll can be piggybacked on every "strict-priority" downlink transmission, with no added overhead).
2) A single, simple (i.e. timer-wheel) scheduler supports both polling and scheduled wakeup periods with a single underlying TSF-based timer.
3) The single power-save method, described in this document, supports both the current 802.11e APSD method and per-stream Service Periods. [Currently, an APSD wakeup schedule coincides with Beacon transmissions. Since Beacon transmissions are synchronized with the TSF timer it is trivial to translate an APSD schedule to a TSF start time and inter-service period.]
4) Synchronizing Poll/Wakeup times with the TSF timer eliminates the synchronization issue with the current 802.11e Service Period mechanism, without requiring any new "distributed" timers. (The current 802.11e Service Period mechanism requires extra timers.)

The combined Polled+EDCF access method eliminates the need for polling error recovery. It also can be used to reduce access latency. [EDCF reduces latency on lightly loaded channels because stations don't need to wait for a poll to transmit; however, it is not as deterministic under heavy loads.] The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of the ordinary skill in the art to utilize the invention in various embodiments and with various modifications as are suited to the particular use contemplated. All such modifications and variations are within the scope of the invention as determined by the appended claims when interpreted in accordance to the breadth to which they are fairly, legally and equitably entitled.

What is claimed is:

1. A method for controlling access by an access point, comprising:
    allocating a fixed transmission window to a target station, the transmission window of sufficient size to enable the target station to send a queued frame in response to a poll;
    establishing a polling schedule for the target station;
    allocating a maximum amount of uplink data based on an application data rate for the target station;
    polling the target station according to the polling schedule when the uplink data sent by the target station does not exceed an admitted data rate; and,
    reclaiming a channel by the access point when the access point receives a response from the target station indicating a last frame of the uplink data explicitly returning the channel to the access point.

2. The method of claim 1, the polling further comprising transmitting a poll, the poll comprising a duration field, wherein the duration field is set to the fixed transmission window.

3. The method of claim 1, further comprising sending a frame to reduce the channel reservation when the access point does not receive an expected response from the target station.

4. The method of claim 1, further comprising reclaiming the channel by the access point when the access point does not receive an expected response from the target station.

5. The method of claim 1, wherein:
    the allocating step further comprises allocating a token bucket for a data stream with a predetermined number of tokens, wherein the sum of the tokens represent a maximum allowed burst for the data stream; and
    the polling further comprises:
    adding a token to the token bucket each time a service timer for the data stream expires, and
    removing tokens from the token bucket each time a data frame is successfully transferred.

6. The method of claim 5, wherein polling is suspended when the token bucket has no tokens.

7. The method of claim 5, wherein downlink frames are not queued in a strict priority queue when the token bucket has no tokens.

8. The method of claim 5, wherein the data stream is an uplink data stream.

9. The method of claim 5, wherein the data stream is a downlink data stream.

10. The method of claim 1, wherein polls for the target station are inserted into a strict priority queue; and
    wherein a hybrid coordination function is employed to prioritize channel access for sending polls in the strict priority queue.

11. An access point, comprising
    at least one strict priority transmit queue and at least one transmit queue having a lower priority than strict priority queue; and
    wherein the access point is operative to allocate a fixed transmission window to a target station, the transmission window of sufficient size to enable the target station to send a queued frame in response to a poll;
    wherein the access point is further operative to establish a polling schedule for the target station;
    wherein the access point is further operative to allocate a maximum amount of uplink data based on an application data rate for the target station;
    wherein the access point is further operative to poll the target station according to the polling schedule by placing a poll frame in the strict priority queue when the uplink data sent by the target station does not exceed an admitted data rate; and,
    wherein the access point is further operative to reclaim a channel when the access point receives a response from the target station indicating a last frame of the uplink data explicitly returning the channel to the access point.

12. The access point of claim 11, wherein the poll frames comprises a duration field, wherein the duration field is set to the fixed transmission window.

13. The access point of claim 11, further operative to send a frame to reduce the channel reservation when the access point does not receive an expected response from the target station.

14. The access point of claim 11, further operative to reclaim the channel when the access point does not receive an expected response from the target station.

15. The access point of claim 11, further operative to allocate a token bucket for a data stream with a predetermined number of tokens, wherein the sum of the tokens represent a maximum allowed burst for the data stream;
    wherein the access point is operative to add a token to the token bucket each time a service timer for the data stream expires, and
    wherein the access point is further operative to remove tokens from the token bucket each time a data frame is successfully transferred.

16. The access point of claim 15, operative to suspended polling when the token bucket has no tokens.

17. The access point of claim 15, wherein downlink frames are queued in the at least one transmit queue having a lower priority than strict priority queue when the token bucket has no tokens.

18. The access point of claim 15, wherein the data stream is an uplink data stream.

19. The access point of claim 15, wherein the data stream is a downlink data stream.

20. The access point of claim 11, wherein a hybrid coordination function is employed to prioritize channel access for sending polls in the strict priority queue.

21. The method of claim 1, wherein allocating a fixed transmission window further comprises receiving from the target station data representative of a minimum transmission window size;
    wherein the fixed transmission window is at least the size indicated by the data representative of a minimum transmission window size.

* * * * *